(12) United States Patent
Pate

(10) Patent No.: US 8,087,516 B2
(45) Date of Patent: Jan. 3, 2012

(54) SYSTEM AND PROCESS FOR TREATMENT OF A CONTAMINATED FLUID

(75) Inventor: Henry O. Pate, Port Orange, FL (US)

(73) Assignee: Battelle Memorial Institute, Richland, WA (US)

( * ) Notice: Subject to any disclaimer, the term of this patent is extended or adjusted under 35 U.S.C. 154(b) by 417 days.

(21) Appl. No.: 12/477,014

(22) Filed: Jun. 2, 2009

(65) Prior Publication Data

US 2010/0300975 A1 Dec. 2, 2010

(51) Int. Cl.
- B01D 33/06 (2006.01)
- B01D 33/39 (2006.01)
- B01D 15/02 (2006.01)
- B01D 3/08 (2006.01)
- B01D 24/32 (2006.01)
- B01D 33/00 (2006.01)
- B01D 15/00 (2006.01)
- B01D 24/00 (2006.01)

(52) U.S. Cl. ........ 210/399; 210/359; 210/361; 210/398; 210/216; 210/150; 210/217; 210/266; 210/219; 210/668; 210/688; 210/758

(58) Field of Classification Search .................. None
See application file for complete search history.

(56) References Cited

U.S. PATENT DOCUMENTS

| | | | | |
|---|---|---|---|---|
| 2,617,986 | A * | 11/1952 | Miller | 96/125 |
| 4,199,456 | A * | 4/1980 | Cheesman | 210/232 |
| 6,582,666 | B2 * | 6/2003 | Tabatabaie-Raissi et al. | 422/186 |
| 2007/0256980 | A1 * | 11/2007 | Krogue et al. | 210/688 |

* cited by examiner

Primary Examiner — Krishnan S Menon
(74) Attorney, Agent, or Firm — James D. Matheson

(57) ABSTRACT

A new device, method, and system are disclosed that provide for removal of undesired materials from a contaminated fluid. Materials present in the fluids are kept in motion in one or more filter cassettes that include disc aerators that improve contact times with the sorbents and that rotate the filter media to pump contaminated water through the filter media for treatment of the contaminated fluids. The device and system provide containment of sorbent fines that keeps the filter media free from clogging.

21 Claims, 4 Drawing Sheets

SYSTEM AND PROCESS FOR TREATMENT OF A CONTAMINATED FLUID

FIELD OF THE INVENTION

The present invention relates generally to devices for sorption of metals. More particularly, the invention relates to a system and method for treatment of a contaminated fluid to remove materials including solids and metals.

SUMMARY OF THE INVENTION

In one aspect, the present invention is a fluid treatment system for treatment of contaminated fluids to remove dissolved or suspended metals and unwanted solids in a treatment zone. The treatment system includes: at least one filter cassette. Each filter cassette includes a pair of opposing discs of a preselected size that connects to a rotation member. Each disc in the pair of discs is separated from the other disc a preselected distance apart. In one embodiment, the discs are aeration discs. Discs are preferably made of a polymer including, but not limited to, e.g., acrylics, nylons, polycarbonates, and combinations of these polymers. In another embodiment, the discs are monolithic discs. In other embodiments, the discs are detachable from the rotation member to facilitate easy replacement or recharging of the internal sorbent. In one embodiment, the discs include half disc portions that permit easy dismantling of the discs from the center rotation shaft. In one embodiment, the separation distance between the discs is about 4 inches, but is not limited. In another embodiment, the discs have a diameter that is at least about 21 inches, but again is not limited. A filter material of a preselected mesh size is affixed to the discs across the separation distance that defines a mixing volume within the cassette that includes a preselected quantity of a sorbent therein. The discs are preferably connected to the rotation member (drive shaft) through the center of each disc. The discs are also preferably vertically disposed on the rotation member to be able to rotate into and out of the contaminated fluid in the treatment zone and to provide proper mixing of the sorbent with the contaminated fluid. In other embodiments, the rotation member includes a hollow core that allows passage of fluids into and out of the filter cassette. In one mode, a contaminated fluid can flow into the cassette. In a reverse mode, a treated fluid can flow into the hollow core of the rotation shaft and pass through. In one embodiment, the rotation member is a drive shaft. The rotation member couples to a drive motor that provides rotation of the filter cassette at a preselected revolution speed in the treatment zone. The rotation member rotates the filter cassette through the contaminated fluid at a preselected rotation rate, which mixes the sorbent with the contaminated fluid. The mesh filter covering of the filter cassette further defines a filtering surface for each filter cassette. The water treatment system removes undesired materials from the contaminated fluid. The mixing volume is charged with a preselected quantity of a sorbent of a preselected size that contacts and mixes with the contaminated fluid at the selected rotation speed in the treatment zone. The sorbent removes preselected material (s) from the contaminated fluid at a preselected rate, providing a preselected end concentration for the material(s) in the treatment zone. In one embodiment, the selective sorbent is a metal-selective sorbent composed of a self-assembled monolayer on a mesoporous support (SAMMS). In one embodiment, the sorbent has an average size greater than or equal to about 40 microns. In another embodiment, a quantity of the metal-selective sorbent is about 1 mg/L of the contaminated fluid to be treated. In another embodiment, at least about 0.75 lb of the metal-selective sorbent is used to treat the fluid. The sorbent can be premixed in a water-alcohol mixture to provide easy introduction into the filter cassette of the system. A single SAMMS sorbent, or a combination of SAMMS sorbents, can be used to remove metals from the treatment zone to a preselected metal concentration or release limit. Metals to be removed include, but are not limited to, e.g., heavy metals, toxic metals, transition metals, rare earth metals, and combinations thereof. In one embodiment, metals include, but are not limited to, e.g., mercury (Hg), lead (Pb), cadmium (Cd), silver (Ag), copper (Cu), cobalt (Co), arsenic (As), and combinations thereof. In one embodiment, the filter cassette includes a cassette mixing volume of at least about 300 cubic inches. The present invention is of a design that contains sorbent powders and fines for remediation uses, without having to resort to use of an engineered form. Materials are kept in motion to improve contact time, using disc aerators to both rotate the filter media and provide a means to pump contaminated fluids (e.g., water) through the treatment zone. In one embodiment, the system is capable of dual and reversible treatment modes. In this embodiment, the system includes a treatment zone defined by a filter cassette mounted on an appropriately sized hollow shaft that includes a port (i.e., it is ported) to allow liquids to flow in two modes, i.e., a cassette mode, or alternatively in a filter-mode (also called backwash-mode). In cassette mode, fluid flows from the port into the cassette and exits through the mesh walls. In filter (backwash) mode, fluid flows through the mesh into the hollow shaft through the port. In both modes, the disc filter assembly rotates at a preselected speed. The invention design provides containment of sorbent fines for such applications as water treatment while keeping the filter media from clogging. Further, in either mode, the device provides a way to separate undesired process solids generated by addition of oxidants such as sodium ferrate (VI), coagulants like ferric chloride, and other reagents, and/or materials for treatment of various fluids. In one embodiment, the rotation member rotates the filter cassette through the contaminated fluid at a rotation rate less than or equal to about 40 revolutions per minute. In another embodiment, the rotation member rotates the filter cassette through the contaminated fluid at a rotation rate in the range from about 20 revolutions per minute to about 40 revolutions per minute. The water treatment system can further include a frame for mounting at least one filter cassette. The frame can include at least one float member (e.g., pontoon) that maintains the proper level for the treatment system in the contaminated fluid in the treatment zone. In other embodiments, the fluid treatment system includes an oxidant source that is operatively coupled to a fluid inlet that introduces reagents that oxidize contaminants to remove them from the contaminated fluid. In other embodiments, the fluid treatment system includes a light panel or device that powers the treatment system. In one embodiment, the treatment system provides a treated fluid at a rate at least about 2-3 gallons per minute, but is not limited. In a preferred configuration, a dual cassette system is used, but is not limited thereto. For example, a single cassette can also be used. In yet other embodiments, multiple cassettes can be used. Thus, no limitations are intended. The invention can be readily configured for use in various fluid treatment apparatuses and protocols.

In another aspect, the invention also includes a method for treating a contaminated fluid in a treatment zone. The method includes the steps of: mixing the contaminated fluid comprising at least one metal and/or at least one solid material with a preselected quantity of a metal-selective sorbent at a preselected rotation rate to provide continuous mixing of the sorbent with the contaminated fluid. The sorbent binds with the at least one metal removing the at least one metal from the fluid to a preselected release limit to form a treated fluid; and filtering the treated fluid to remove the at least one solid material to form a filtered treated fluid. The method further includes the step of releasing the filtered treated fluid, e.g., back into the treatment zone.

The cassette design, described further herein, in combination with filtering and pumping means, and low rotational speeds will reduce energy, and provide cost benefits in equipment and labor requirements in field applications. The invention should allow, e.g., for long-term water treatment in remote and primitive areas including, e.g., Africa, and China, where simple devices are needed to achieve objectives and where results depend on time of treatment and where alternative energy sources such as solar energy sources can be used at rates that are competitive with current technologies.

DETAILED DESCRIPTION OF THE INVENTION

A filter device, system, and method are disclosed that provide for long-term treatment of contaminated fluids that contain metals (suspended or dissolved) and/or solid contaminants derived or obtained from various sources and operations including, e.g., mining, power generation, and like operations. The invention further processes contaminated fluids that contain biological components, plant life, and sea life including, e.g., algae, mussels, or like elements that are removed automatically in a reliable and efficient manner allowing contaminated fluids to be treated in an efficient manner. While particular embodiments are described hereafter, it is to be distinctly understood that the invention is not limited thereto but may be variously embodied according to the needs and necessities of a user or the applications or treatment protocols into which the invention will be implemented. Further, from this description it will be noted that various modifications, alterations and substitutions may also be made without departing from the spirit of the invention as set forth in the scope of the claims which are listed hereafter. Accordingly, the present description of the preferred embodiment should be seen as illustrative only and not limiting.

Figure 1A:
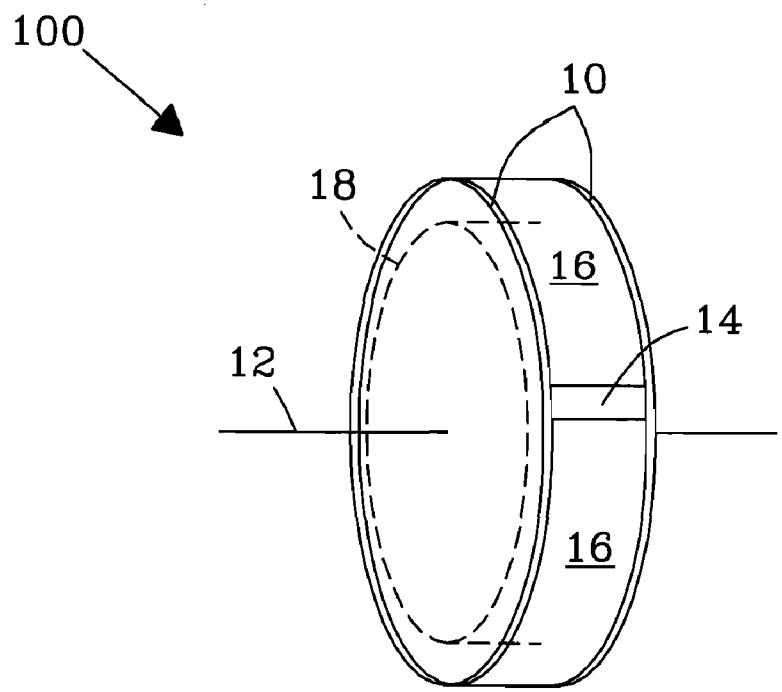
FIGS. 1a-1b show filter cassettes for a fluid treatment device, according to different embodiments of the invention.

FIG. 1a is a perspective view of a filter cassette 100 for passive treatment of a fluid. In the figure, filter cassette 100 includes two aeration discs 10 (e.g., 21" discs) that are center-bored and mounted apart on a rotation member 12 (e.g., a 0.75" drive shaft). Separation distance between each disc of the filter cassette can be varied. A preferred separation distance is at least 4" apart. In the figure, aeration discs 10 are of a monolithic design. Dimensions are not limited. Aeration discs 10 are preferably mounted vertically so as to be vertically parallel on rotation member (drive shaft) 12. Separators 14 are positioned between aeration discs 10, e.g., at 0°, 120°, and 240° to maintain the separation distance between the discs, which ensures the stability and rigidity of the discs as they rotate through a fluid. Separators 14 are constructed, e.g., of polycarbonate, but materials are not limited. Exemplary dimensions include: 1.25" width×3.5" length×1/16" thickness, but are not limited. Number of separators is also not limited. Separators 14 provide a secure surface for attaching mesh filter 16. Mesh filter 16 attaches to each disc 10 and spans the separation distance between aeration discs 10, forming a cavity 18 between the discs that has a preselected volume for treating a fluid. Mesh filter 16 is preferably constructed of a nylon fabric, e.g., NITEX® (Wildco and Aquatic Ecosystems Inc., Apopka, Fla., USA), or like material, which can be attached to aeration discs 10 and any of separators 14 using, e.g., acrylic glue, available commercially, or another attachment means. A preferred screen/mesh size is about 20 µm, but is not limited thereto. For example, size may be varied depending on needs of the user and the intended application. Thus, no limitations are intended. Mesh filter 16 is cut or fashioned to be slightly wider (about 25%) than the width of cassette 100 or the distance between discs 10 such that the mesh material between aeration discs 10 is loosely fitting (i.e., not taut). This design allows mesh filter 16 to move back and forth in the fluid as the cassette rotates, which keeps mesh filter 16 from clogging. Sorbent 20 used to treat the fluid is introduced to cavity 18 of filter cassette 100. Aeration discs 10 are preferably constructed of preselected polymers that are sturdy but light-weight, e.g., acrylics, nylons, polycarbonates (e.g., LEXAN®, Saudi Basic Industries, Corp. (SABIC), Riyadh, Saudi Arabia), or other suitable polymers and materials. Polymers are preferred as: 1) mesh filter 16 bonds well to these materials; 2) the bond is tough enough to withstand heavy use, yet can be peeled away by hand without damaging the filter mesh or cassette; 3) allows sorbents to be easily exchanged or the condition of sorbents to be assessed; 4) allows fluid flow, as well as sorbent and fluid mixing to be assessed; 5) reduces corrosion problems, and 6) has an attractive appearance. In a test case, aeration discs were prepared of LEXAN® at a thickness of 0.5 inches. Each disc was 21" in diameter, but is not limited thereto. For example, diameter of the discs can vary up to more than 2 meters. Filter cassette 100 was mounted and secured to a 0.75" threaded rod constructed of, e.g., 6061-aluminum using lock nuts (e.g., aluminum nuts and nylon lock rings) positioned inside and outside of each disc, but method of attachment is not limited thereto.

Figure 1B:
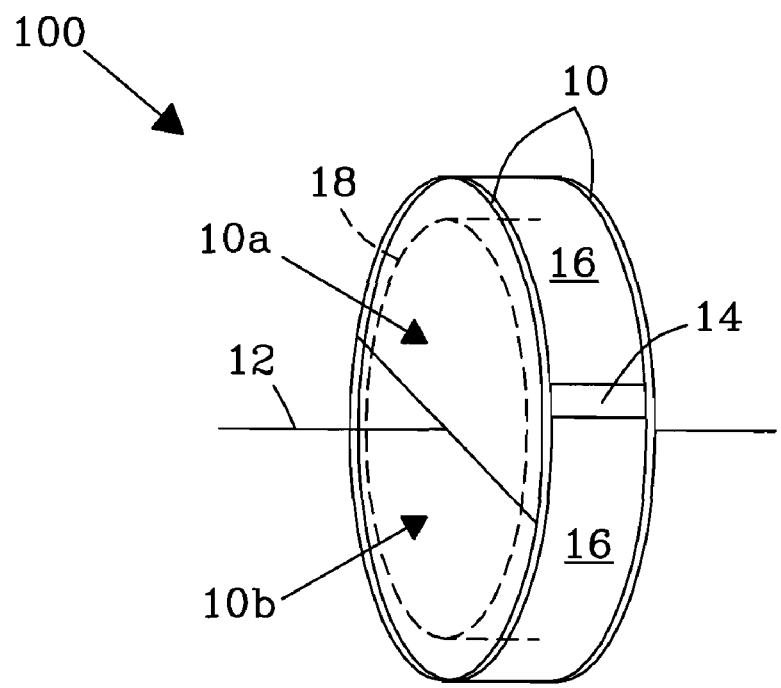

FIG. 1b shows another embodiment of a filter cassette 100 for passive treatment of a fluid. In this embodiment, filter cassette 100 includes two aeration discs 10 (e.g., 21" discs) of a half-disc design. In the figure, each aeration disc 10 includes a top half portion 10a and a bottom half portion 10b that close over rotation member (drive shaft) 12 (e.g., a 0.75" threaded rod) mounting to rotation member 12 through the center of each aeration disc 10. Securing each half portion can be achieved through conventional coupling means as will be known and understood by those skilled in the art. Again, dimensions are not limited. Aeration discs 10 are preferably vertically mounted on rotation member 12 so as to be vertically parallel. Separators 14 are positioned between aeration discs 10, e.g. at 0°, 120°, and 240° to maintain separation distance between the discs, and to provide stability and rigidity to the discs as they rotate through a fluid. The separators further provide a secure surface for attaching filter mesh 16. Mesh filter 16 when attached to aeration discs 10 defines cavity 18 of filter cassette 100 between aeration discs 10, as described previously herein. Mesh filter 16 is cut or fashioned to be slightly wider (about 25%) than the width of cassette 100 or the distance between discs 10 such that the mesh material between aeration discs 10 is loosely fitting (i.e., not taut). This design allows mesh filter 16 to move back and forth in the fluid as the cassette rotates, which keeps mesh filter 16 from clogging. Sorbent 20 used to treat the fluid is introduced to cavity 18 of filter cassette 100. The half-disc design allows for ease of decoupling from rotation member 12 for purposes of introducing, removing, and recharging sorbent 20 in cavity 18 of filter cassette 100.

Figure 2:
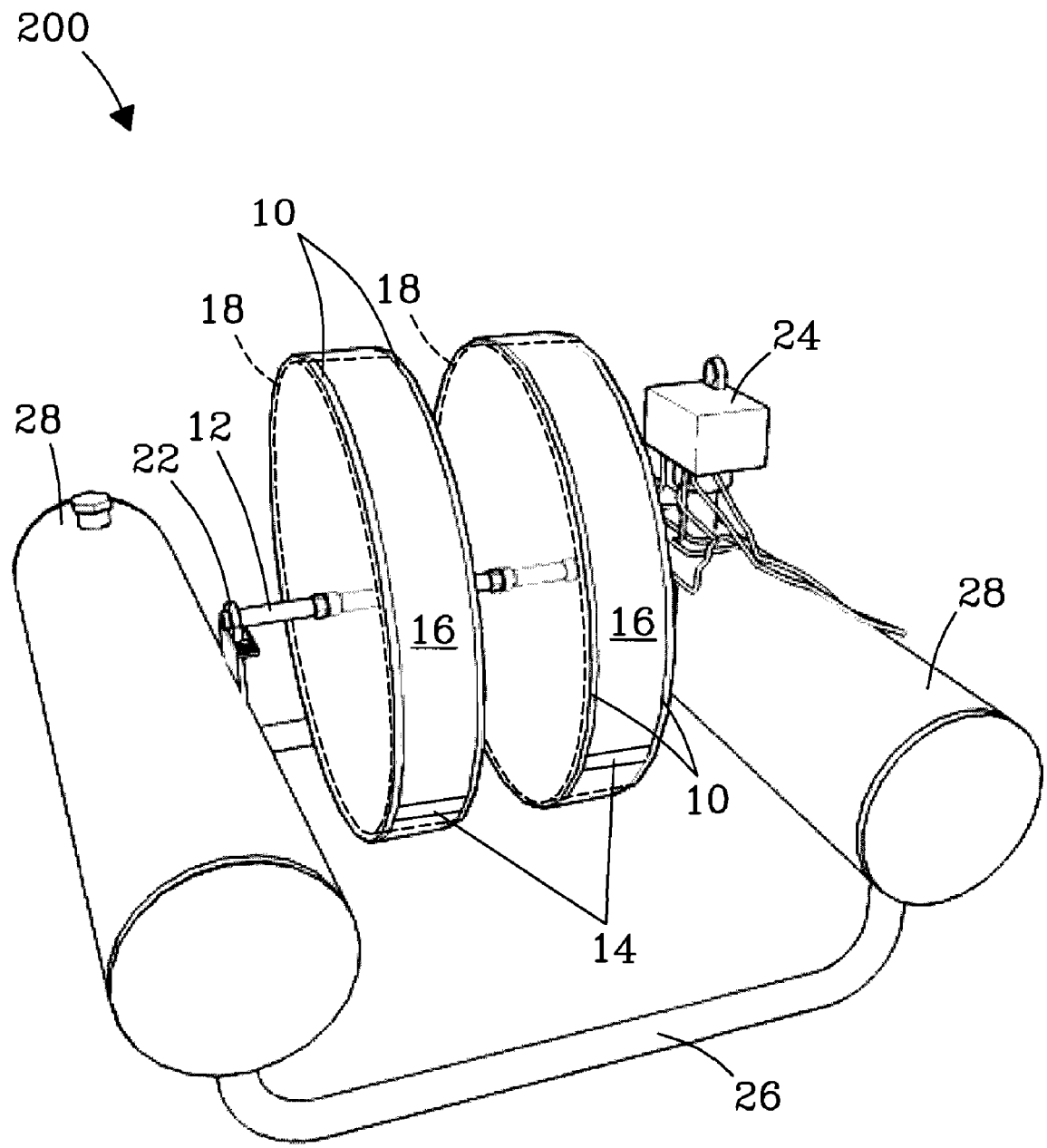
FIG. 2 is a perspective view of a fluid treatment system of a dual cassette design, according to one embodiment of the invention.

FIG. 2 shows a filter system 200 for passive treatment of a fluid, according to another embodiment of the invention. In an exemplary application, the system is configured for removing metals in a metal-contaminated fluid in a treatment zone. In the figure, the exemplary system 200 includes two filter cassettes 100 described previously herein. Each filter cassette 100 includes two monolithic aeration discs 10 (e.g., 21" discs) described previously herein (see, e.g., description for FIG. 1a) that are center-bored that mount to rotation member (drive shaft) 12, e.g., to a 0.75" drive shaft. Aeration discs 10 are preferably mounted so as to be vertically parallel on drive shaft 12. Separators 14 maintain a separation distance between the discs and provide stability and rigidity to the discs as they rotate in a fluid. Separators also provide a secure surface for attaching filter mesh 16, as described previously herein. Mesh filter 16 is loosely fitting. Mesh filter 16 is cut or fashioned to be slightly wider (about 25%) than the width of cassette 100 or the distance between discs 10 such that the mesh material between aeration discs 10 is loosely fitting (i.e., not taut). This design allows mesh filter 16 to move back and forth in the fluid as the cassette rotates, which keeps mesh filter 16 from clogging. In the figure, two filter cassettes 100 are shown, but number is not limited. Number of filter cassettes 100 deployed depends on the selected length of drive shaft 12 and requirements for the intended application. In the figure, rotation member (drive shaft) 12 couples to, and rotates within, self adjusting bearings 22 positioned at each of opposite ends of the drive shaft rod. Rotation is provided, e.g., by a motor 24 that provides the necessary torsion for turning filter cassette 100 in the fluid to be treated. Rotation member 12 is connected to drive motor 24 with a suitable coupling (e.g., a flexible spider coupling) as will be known by those skilled in the mechanical arts, which is not limited. System 200 further includes a mounting frame 26 that includes tanks 28 (e.g., model 6061 anodized aluminum pontoons, Merrell Welding, Port Orange, Fla., USA) that floats the treatment system at a desired level in the contaminated fluid within the treatment zone. Filter cassettes 100 of system 200 are prepared for use by loading the cassettes with a preselected quantity of a suitable sorbent, e.g., a solid metal-selective sorbent. Types of sorbents used will depend on the intended application. A preferred sorbent includes a self-assembled monolayer on a mesoporous support (SAMMS®) available commercially (Steward Environmental Solutions, Inc., Chattanooga, Tenn., USA) or a like material. SAMMS® sorbents exhibit a preselected affinity for preselected metal(s). Thus, a single sorbent can be used to selectively capture a single preselected metal. Or, combinations of metal-selective sorbents can be used to capture more than one metal. No limitations are intended. Sorbent is introduced into interior cavity 18 of each filter drum. The metal-selective sorbent is introduced to the filter cassette by opening the mesh filter along the outer exterior edge of the filter cassette, introducing the sorbent through the opening between the discs into the interior cavity of the filter drum. The filter cloth was then reattached to seal the opening. Each filter cassette was then mounted onto the drive shaft. Filter cassettes may be preloaded with the selected sorbent(s) in advance of treatment of the intended fluid to allow rapid exchange of spent filter media during operation. Aeration discs 10 are mounted to center drive shaft 12, and the sorbent-loaded filter cassette 100 is immersed in the fluid to be treated. Preferred depth is about one-third the diameter of the aeration discs 10, but is not limited thereto. Cassette 100 is then rotated through the fluid, which mixes the sorbent and the fluid within cavity 18 of the filter cassette. In an exemplary case for treatment of a metal-contaminated fluid, rotation of filter cassette 100 containing, e.g., a metal-selective sorbent about the drive shaft 12 axis in the metal-contaminated fluid (e.g., water) allows the fluid to pass into the filter cassette through the exterior edge of the filter mesh and into cavity 18 that contains the metal-selective sorbent. Rotation of the filter drum mixes the solid sorbent with the contaminated fluid, whereby the sorbent passively captures and removes metals from the contaminated fluid. Rotation rate and diameter of the cassette discs can be varied, but are selected so as not to exceed the erosion limit for the sorbent. For example, SAMMS® sorbent has a rotation limit of about 40 rpm in a 21-inch diameter cassette configuration. Rotation limit can be determined experimentally or by calculation for a given diameter of the cassette disc. Rotation rate is variable, with a speed that depends on expected treatment and maintenance cycles, but selection parameters are not limited. The metal-depleted fluid (i.e., treated fluid) exits back through the filter mesh anywhere along the mesh surface of the filter drum and exits the filter drum as a treated fluid. The mesh prevents sorbent fines from escaping the interior of the drum. In the exemplary device, a single linear drive shaft is used to provide rotation of the filter cassette (cassettes). While the exemplary device employs two filter cassettes, number of filter cassettes used is not limited. Frame 26 (e.g., Merrell Welding, Port Orange, Fla., USA) can be adjusted to preselected heights within the treatment zone. The treatment system of the instant embodiment is stationary. It is typically placed in the fluid to be treated within the treatment zone. A preferred depth for the filter cassette in a treatment zone is a level that permits the bottom third of the filter cassette discs to be in contact with the fluid being treated. This creates a sufficient flow within the filter cassette around the discs in the direction of rotation of the immersed part of the cassette. Within each filter cassette, sorbent and fluid being treated are in constant motion, with treated fluid being ejected outward through the mesh, usually at the point where the cassette discs rotate out of the fluid. A plume of fluid is typically observed at the interface. Ballast tanks 28 positioned in conjunction with frame 26 maintain position and level of aeration discs 10 in the treatment zone. Ballasts (pontoons) can be adjusted (e.g., by adding water) before use to position the system in the fluid being treated or to draft the unit lower as needed so as to maintain contact with the fluid being treated. In the exemplary system, ballast tanks had dimensions (7" dia.×3' long), but are not limited thereto. For example, size and dimensions are a function of the number of attached cassettes and the total weight of selected sorbent(s) and system components. While ballast tanks are used in the exemplary device, the system is not limited thereto. Other leveling and positioning components can be used including, but not limited to, e.g., fixed platforms and/or flanged platforms that include piping systems and components. No limitations are intended by descriptions of the exemplary configurations. Dimensions of the cassettes and operation parameters such as rotation speed are not limited. All parameters as will be selected by those of skill in the art in view of the disclosure are within the scope of the invention.

Figure 3:
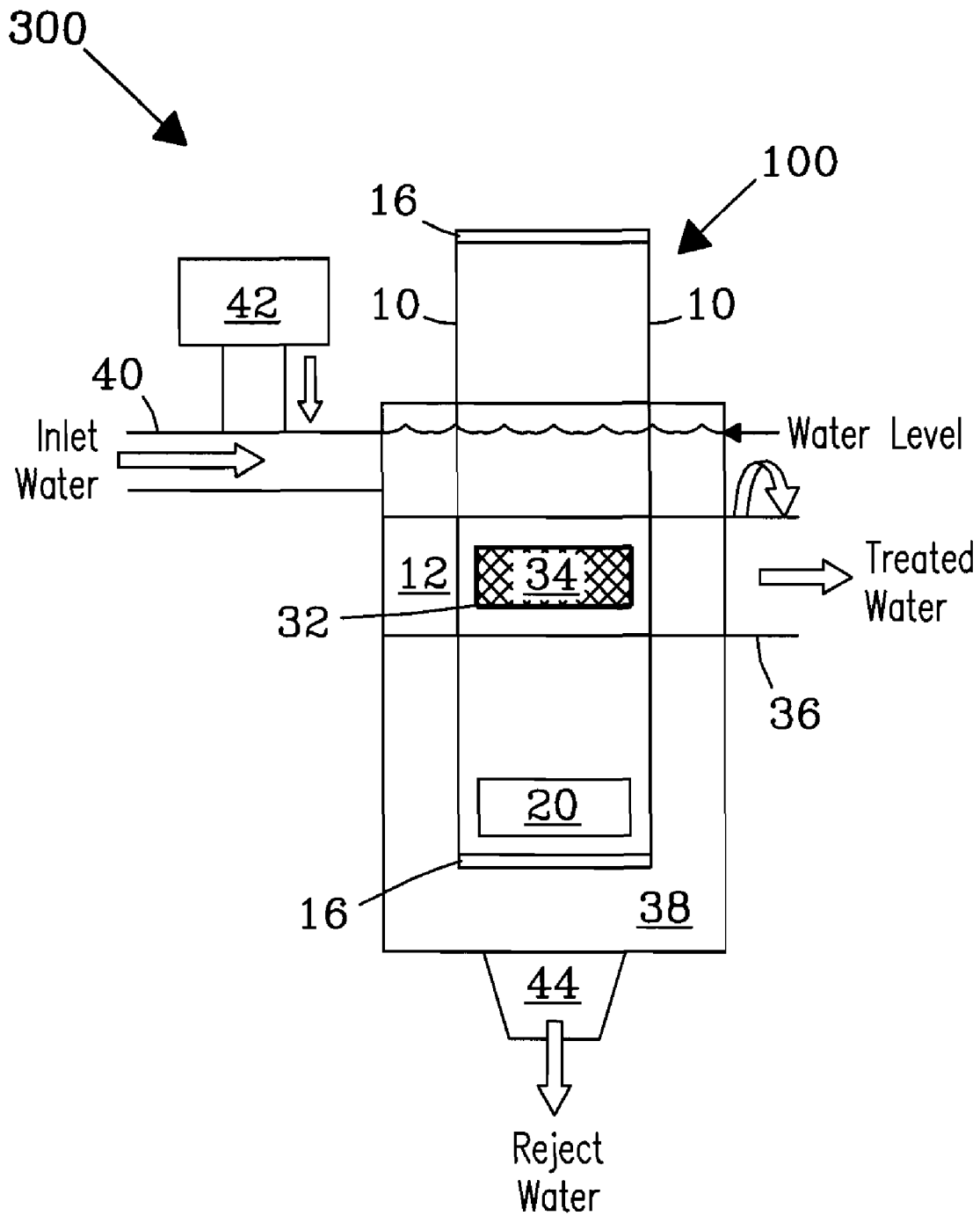
FIG. 3 shows a fluid treatment system of a hollow-shaft design, according to another embodiment of the invention.

FIG. 3 shows a filter system 200 for passive treatment of a fluid, according to another embodiment of the invention. In the instant embodiment, system 200 includes a single filter cassette 100 described previously herein with reference to FIGS. 1a-1b. Filter cassette is mounted to, and rotates about, the axis of a central drive shaft 12 or rotation member 12. Contaminated fluid is received through a fluid inlet 40 and introduced into fluid reservoir 38 for treatment of the contaminated fluid. An in-situ chemical generator 42 (Battelle Memorial Institute, Columbus, Ohio, USA) for production of sodium ferrate (VI) [CAS No. 13773-03-0] (Chemical Formula $Na_4FeO_4$) is coupled to fluid line 40. Sodium ferrate released into fluid line 40 oxidizes dissolved materials in the fluid and/or chemically destroys undesired chemical constituents therein. The oxidized fluid fills tank 38 to a preselected level. Undissolved fines and particulates settle to the bottom of tank 38 which can be flushed through drain 44 located in the bottom of the reservoir. A suitable and preselected quantity of sorbent 20 introduced to cavity 18 of filter cassette 100 provides further treatment of fluid introduced to reservoir 38, e.g., by selectively capturing, and thus removing, dissolved metals therein. Filter cassette 100 rotates at a preselected rate and speed through the fluid in reservoir 38 about a central drive shaft 12 as described previously herein. The contaminated fluid mixes with the sorbent 20 in cavity 18 of filter cassette 100 where, e.g., dissolved metals are removed from the fluid. In the instant embodiment, drive shaft 12 includes a hollow inner core (not shown) that extends through the interior along the length of shaft 12. Following treatment with the sorbent, drive shaft 12 receives the treated fluid from cavity 18 as the filter cassette rotates about the axis of drive shaft 12. Treated fluid is transported through drive shaft 12 and exits through shaft outlet 36.

Figure 4:
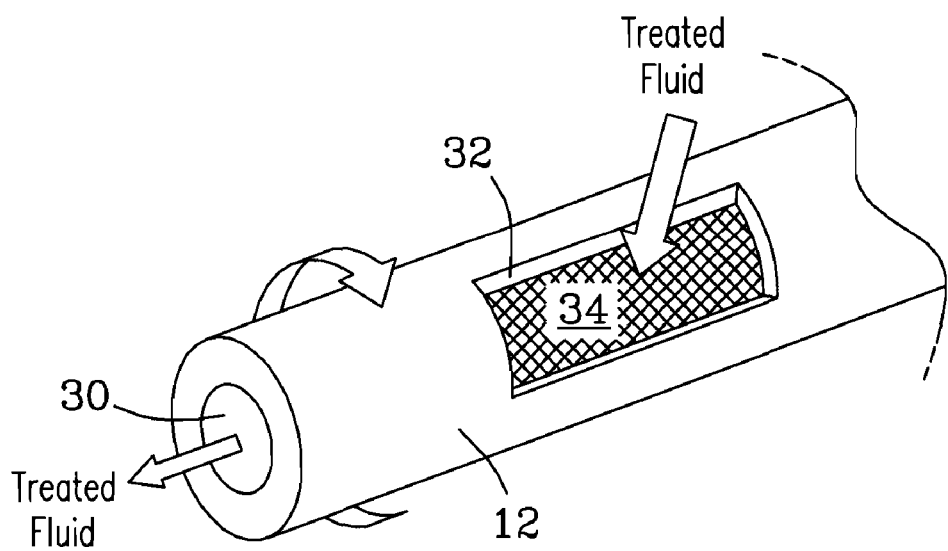
FIG. 4 shows a perspective view of the hollow drive shaft of FIG. 3 that provides rotation of the filter cassette.

FIG. 4 shows a drive shaft (rotation member) 12 of a hollow design that provides for rotation of a filter cassette, according to an embodiment of the invention. In the instant embodiment, drive shaft 12 includes a hollow inner core 30 that extends through the interior along the length of shaft 12. Drive shaft 12 receives treated fluid after mixing with the sorbent as the filter cassette rotates about the axis of the (hollow) drive shaft. Treated fluid enters inner core 30 of drive shaft 12 through shaft port 32 located on the external surface of the drive shaft (rotation member) 12. Shaft port 32 includes a screen cover 34 that prevents sorbent fines from entering core 30. Drive shaft 12 transports the treated fluid, which exits from the core 30 of drive shaft 12 through shaft outlet 36.

Example 1

Removal of Mercury from a Metal-Contaminated Fluid

Figure 5:
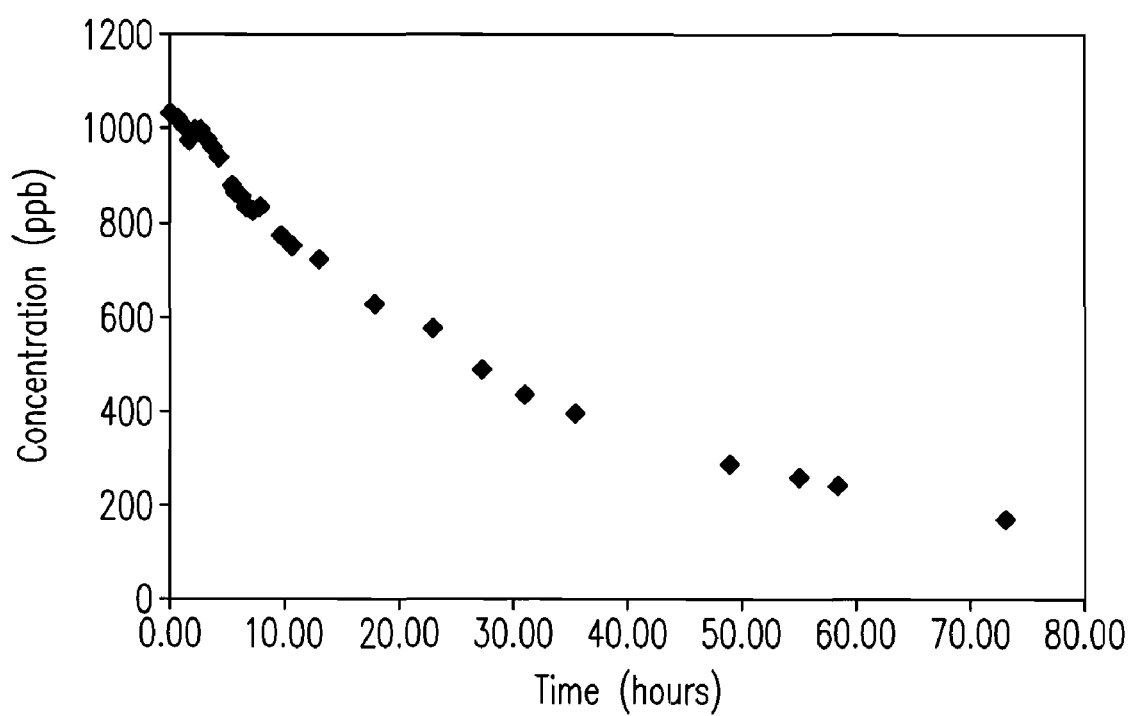
FIG. 5 is a plot that shows the decrease in mercury concentration in a mercury-contaminated fluid as a function of treatment time with the invention.

The fluid treatment system of FIG. 2 was used to treat a mine tailing (leach pad) pond contaminated with mercury metal from a silver mining operation. The system was configured with dual filter cassettes and floated on the surface of a ~4300 gallon tank filled with leach pad water. Each filter cassette was loaded with 0.75 lbs of a mercury-selective SAMMS® sorbent (mesh size of ~40 μm) (Steward Environmental Solutions, Chattanooga, Tenn., USA) for a total of 1.5 lbs of the sorbent. Sorbent was used as procured. Center drive shaft was powered using a 1/15 horse-power motor, but is not limited thereto. Filter cassettes were rotated at a rate of ~36 revolutions per minute which produced a flow rate of treated water of ~2-3 gallons per minute (gpm). While exemplary conditions are disclosed, parameters are not limited thereto. FIG. 5 shows the decrease in concentration of mercury (Hg) as a function of treatment time achieved in conjunction with the invention. Results show a decrease in the concentration of mercury from a high of about 1080 ppb to below 200 ppb within 72 hours.

CONCLUSIONS

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the spirit and scope of the invention.

I claim:

1. A fluid treatment system floatable on a contaminated fluid for removing a contaminant from said contaminated fluid, comprising:

at least one filter cassette defined by a pair of opposing discs of a preselected size disposed on a rotation member, each disc in said at least one pair is separated from the other disc a preselected distance; and a mesh filter of a preselected mesh size affixed to said discs that spans said preselected distance between said discs that defines a cavity of a preselected filter volume therein, said cavity includes a preselected quantity of a sorbent therein;

two parallel floats perpendicularly interconnected by said rotation member, said filter mounted axially on said rotation member; and a drive means to drive said rotation member to rotate said filter cassette on its axis at a preselected rotation rate through said contaminated fluid that mixes said sorbent with said contaminated fluid introduced thereto thereby removing said contaminant from said fluid.

2. The fluid treatment system of claim 1, wherein said discs are aeration discs.

3. The fluid treatment system of claim 1, wherein said discs are composed of a polymer.

4. The fluid treatment system of claim 3, wherein said polymer is an acrylic, a nylon, or a polycarbonate.

5. The fluid treatment system of claim 1, wherein said discs are monolithic discs.

6. The fluid treatment system of claim 1, wherein said discs are detachable from said rotation member.

7. The fluid treatment system of claim 1, wherein said discs include half disc portions.

8. The fluid treatment system of claim 1, wherein said preselected separation distance is 4 inches.

9. The fluid treatment system of claim 1, wherein said discs have a diameter of at least about 21 inches.

10. The fluid treatment system of claim 1, wherein said filter cassette defines a cassette volume of at least about 300 cubic inches.

11. The fluid treatment system of claim 1, wherein said discs are connected to said rotation member through the center of said discs.

12. The fluid treatment system of claim 1, wherein said rotation member defines a hollow core for introduction of a fluid and passage therethrough.

13. The fluid treatment system of claim 12, wherein said rotation member further includes a port with a screen covering on an exterior surface thereof for entry of a treated fluid into said hollow core.

14. The fluid treatment system of claim 1, wherein said sorbent introduced to said filter cassette is a metal-selective sorbent that when mixed with said fluid at a preselected rotation speed discharges a metal-depleted fluid therefrom with a metal concentration at a preselected release limit.

15. The fluid treatment system of claim 1, further including:

a fluid inlet coupled to a fluid reservoir that delivers said contaminated fluid into said reservoir;

wherein said rotation member rotates said at least one filter cassette through said contaminated fluid in said reservoir mixing said fluid with said sorbent in said filter cassette at a preselected rate yielding a treated fluid; and wherein said rotation member includes a port covered by a screen of a preselected mesh size providing entry of said treated fluid therein through a hollow core defined within said rotation member that delivers said treated fluid from said system.

16. The fluid treatment system of claim 1, further including an oxidant source operatively coupled to said fluid inlet that introduces reagents that oxidize said contaminant removing same from said fluid.

17. The fluid treatment system of claim 1, wherein said rotation member rotates said filter cassette through said contaminated fluid at a rate less than or equal to about 40 revolutions per minute.

18. The fluid treatment system of claim 1, wherein said rotation member rotates said filter cassette through said contaminated fluid at a rotation rate selected in the range from about 20 revolutions/min to about 40 revolutions/min.

19. The fluid treatment system of claim 1, herein said system provides a treated fluid at a rate of at least about 2-3 gallons per minute.

20. The fluid treatment system of claim 1, wherein said sorbent is a metal-selective sorbent comprised of a self-assembled monolayer on a mesoporous support that selectively removes a metal from said contaminated fluid to a preselected metal concentration level.

21. The fluid treatment system of claim 1, wherein said sorbent removes metals from said fluid selected from the group consisting of: mercury (Hg), lead (Pb), cadmium (Cd), silver (Ag), copper (Cu), cobalt (Co), arsenic (As), and combinations thereof.

* * * * *